(12) United States Patent
Schmuck et al.

(10) Patent No.: US 7,684,699 B2
(45) Date of Patent: Mar. 23, 2010

(54) OPTICAL TRANSCEIVER MODULE FOR MONITORING AN OPTICAL FIBER AND METHOD FOR MAKING AVAILABLE MEASURING DATA FROM MONITORING AN OPTICAL FIBER

(75) Inventors: Harald Schmuck, Schwieberdingen (DE); Thomas Pfeiffer, Stuttgart (DE); Jörg Hehmann, Weil der Stadt (DE)

(73) Assignee: Alcatel Lucent, Paris (FR)

( * ) Notice: Subject to any disclaimer, the term of this patent is extended or adjusted under 35 U.S.C. 154(b) by 730 days.

(21) Appl. No.: 11/517,310

(22) Filed: Sep. 8, 2006

(65) Prior Publication Data
US 2007/0058979 A1    Mar. 15, 2007

(30) Foreign Application Priority Data
Sep. 12, 2005    (EP)    ................................ 05291883

(51) Int. Cl.
*H04B 10/08*    (2006.01)
(52) U.S. Cl. ................................ 398/33; 398/22; 398/25
(58) Field of Classification Search .................. 398/9, 398/15, 17, 20–22, 25, 28, 33
See application file for complete search history.

(56) References Cited
U.S. PATENT DOCUMENTS 5,093,568 A    3/1992    Maycock 6,549,310 B1    4/2003    Kuchta et al.
7,341,384 B2 *    3/2008    Chan et al. .................... 385/92
2003/0007215 A1*    1/2003    Snawerdt .................... 359/152
2003/0210387 A1    11/2003    Saunders et al.
2005/0238355 A1*    10/2005    Leite et al. .................... 398/58

FOREIGN PATENT DOCUMENTS

EP    1 524 781 A1    4/2005
EP    1 624 593 A1    2/2006

* cited by examiner

*Primary Examiner*—Dalzid Singh
(74) *Attorney, Agent, or Firm*—Harness, Dickey & Pierce

(57) ABSTRACT

The invention concerns a transceiver module for an optical data network, comprising an optical interface for connection with an optical transmission line and an electrical interface for connection with a host board, wherein the electrical interface is suitable for providing the transceiver module with payload data to be sent on the optical transmission line and for providing the host board with payload data read from the optical transmission line, and further comprising monitoring means for monitoring the optical transmission line, which the transceiver module comprises an analyzing means for processing measuring data provided by the monitoring means in a statistical manner, and where the analyzing means is connected to the electrical interface for providing processed measuring data to the electrical interface. The inventive transceiver module is easy to install, and only a small amount of monitoring data needs to be transferred.

12 Claims, 2 Drawing Sheets

OPTICAL TRANSCEIVER MODULE FOR MONITORING AN OPTICAL FIBER AND METHOD FOR MAKING AVAILABLE MEASURING DATA FROM MONITORING AN OPTICAL FIBER

BACKGROUND OF THE INVENTION

The invention is based on a priority application EP 05291883.6 which is hereby incorporated by reference.

The invention relates to a transceiver module for an optical data network, comprising an optical interface for connection with an optical transmission line and an electrical interface for connection with a host board, wherein the electrical interface is suitable for providing the transceiver module with payload data to be sent on the optical transmission line and for providing the host board with payload data read from the optical transmission line, and further comprising monitoring means for monitoring the optical transmission line.

The invention further relates to a method for making available measuring data from monitoring an optical transmission line coupled to an optical transceiver module.

Such a transceiver module is known from the European patent application 04 291 995.1, scheduled to be published after the submission of this application.

In order to transmit digital data, optical networks are used. An optical network comprises optical transceivers which are linked by optical transmission lines, in particular optical fibers.

It is common to realize optical transceivers with optical transceiver modules. An optical transceiver module is a device for converting electrical signals carrying payload data, received at an electrical interface, into optical signals, which are sent onto an optical interface (where an optical transmission line is attached), and for converting optical signals, received at the optical interface, into electrical signals. The payload data, no matter whether contained in received electrical signals or contained in received optical signals, is only passed on, without any analysis of the payload data such as error analysis or error correction within the transceiver module.

The transceiver module is typically linked to a host board, where data to be sent and received data are processed and analysed.

Unfortunately, optical fibers may become defective. A defect may cause a loss of data. For this reason, the status of an optical fiber in an optical network must be monitored. A well known monitoring method is OTDR (optical time domain reflectometry). In this method, a short optical pulse is sent onto an optical fiber, through which it propagates. At locations of defects, such as a sharp bend within the optical fiber, light of the optical pulse is particularly strongly backscattered. The time between the sending the pulse and receiving a peak of backscattered light indicates the location of the defect.

From the above mentioned European patent application, it is known to integrate equipment for an OTDR measurement, in particular a tap coupler, a photo diode and an OTDR signal output, into an optical transceiver module. The ODTR signal is passed on, without any signal analysis, to a failure detection means externally of the transceiver module via the OTDR signal output.

In order to learn about the state of the optical fiber, in this state of the art, a large amount of data must be transferred over the OTDR signal output. Further, the installation of the optical transceiver module requires linking both a data interface and an ODTR signal output.

SUMMARY OF THE INVENTION

It is the object of the invention to provide an optical transceiver module which is easier to install and with which only a small amount of monitoring data needs to be transferred.

This object is achieved, in accordance with the invention, by a transceiver module for an optical data network, comprising an optical interface for connection with an optical transmission line and an electrical interface for connection with a host board, wherein the electrical interface is suitable for providing the transceiver module with payload data to be sent on the optical transmission line and for providing the host board with payload data read from the optical transmission line, and further comprising monitoring means for monitoring the optical transmission line, wherein the transceiver module comprises an analysing means for processing measuring data provided by the monitoring means in a statistical manner, and wherein the analysing means being connected to the electrical interface for providing processed measuring data to the electrical interface.

With the inventive transceiver module, the amount of monitoring data to be outputted can be reduced. With the analysing means, the measured data is processed in a statistical manner, and only the results of this statistical processing are outputted as processed measuring data. Typically, the processing comprises an averaging. The resulting processed measurement data is typically a much smaller amount of data than the raw measurement data. The analysing means may also be designed for providing explicit information whether the monitored optical fiber is ready for operation or not, or for providing other coarse information about the status of the optical transmission line. This may be done by a comparison of the measuring data or the processed measuring data with reference values and/or tolerance intervals. A "ready for operation or not" indication means, such as a light emitting diode, may be provided at the housing of the transmitter module.

Further, the processed measuring data is not sent onto a separate monitoring output or interface, but the processed measuring data is provided to the electrical interface also used for payload data. Since the amount of monitoring data to be outputted is rather small in accordance with the invention, there is no significant loss in the transfer capacity of payload data at the electrical interface. A separate monitoring output or interface is dispensed with. This means that the installation of the transceiver module is simplified, as well as the external design of the inventive transceiver module as a whole.

Note that as far as the payload data is concerned, no signal analysis or statistical processing takes place within the inventive transceiver module. The analysing means only processes monitoring data checking the state of the optical fiber. In particular, the payload information is only passed on by the inventive transceiver module. For the payload data, the transceiver module is only an electrical-optical conversion interface.

A transceiver module in accordance with the invention has typically a length of about 5 to 8 cm and a diameter of about 1.5 to 2.5 cm. Typical representatives of transceiver devices (i.e. transceiver modules) that can be modified and used in accordance with the invention are SFF (Small Form-Factor), SFP (Small Form-Factor Pluggable) or GBIC (Gigabit Interface Converter) modules.

With the inventive transceiver module, an improved access to the monitoring results, i.e. the processed measuring data, is available. In a preferred embodiment of the inventive transceiver module, the electronic interface comprises a bidirectionally operating electrical bus, in particular an $I^2C$ bus. Such a bus is an approved means for transferring data. With this electrical bus, monitoring parameters as well as monitoring data may be exchanged easily between the transceiver module and the host board.

Further preferred is an embodiment wherein the analysing means comprises an analogue to digital (=A/D) conversion unit and a processing unit. The A/D conversion unit typically receives analog measuring data from a photo diode and provides digital measuring data to the processing unit, which does the processing. The processing unit is typically realized as an integrated circuit or chip.

A preferred further development of this embodiment is characterized in that the processing unit comprises an input memory, a processing memory, in particular suitable for an averaging operation, and an output memory. This design is well-suited for a real time extraction of measuring data.

In another preferred embodiment of the inventive transceiver module the monitoring means is designed to perform optical time domain reflectometry (=OTDR). OTDR is an approved method for monitoring an optical fiber.

In the scope of the invention is also a transceiver arrangement comprising an inventive transceiver module as described above, and a host board, wherein the transceiver module is connected to the host board via the electrical interface only. The transceiver module is easy to install and to change, e.g. in case of a defect. The host board may, in accordance with the invention, be designed to further process or analyse the processed measuring data provided by the transceiver module.

Also within the scope of the invention is a method for making available measuring data from monitoring an optical transmission line coupled to an inventive optical transceiver module as described above, wherein a monitoring means monitors the optical transmission line, wherein measuring data provided by the monitoring means is processed still within the optical transceiver module in a statistical manner, thus generating processed measuring data, and wherein only the processed measuring data is output via an electrical interface of the optical transceiver module.

The method provides the transceiver module with an additional functionality, which saves data transfer capacity. The monitoring data is made available more easily and quicker. The data handling is made simpler, since only one electrical interface is used for all data (i.e. payload data and monitoring data).

In an advantageous variant of the inventive method, during processing the measuring data of the monitoring means, a trace transfer frequency is decimated. This decimation is achieved, in accordance with the invention, by an averaging. E.g., ten traces each of a single pulse are added up to generate an averaged trace. A trace is a diagram plotting amplitude of backscattered light versus time (or distance).

Another advantageous variant of the inventive method is characterized in that the electric interface is also used to provide monitoring parameters to the optical transceiver module. Then the monitoring parameters may be chosen and changed as required, without the need for further electrical interfaces.

A preferred variant of the inventive method is characterized in that the electric interface comprises a bidirectionally operating electric bus, and that part of the available frequency range of the electric bus is allocated to providing monitoring parameters to the optical transceiver module and/or to the processed measuring data. The allocation simplifies the data transfer.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

The invention relates to an optical transceiver module comprising monitoring means for monitoring an optical transmission line, and a method for making available measuring data gathered by the monitoring means of the transceiver module.

The invention proposes to process the measuring data still within the optical transceiver module in a statistical manner, and to make externally available only the processed measuring data. The processed measuring data is made available with the same electrical interface that handles the payload data. In particular, an electrical bus may be integrated into the electrical interface for this purpose.

In the transceiver module, an additional analyzing means is integrated. This analyzing means allows the determination (or helps in the determination) of characteristics, i.e. physical parameters, of the optical transmission line linked to the transceiver module. The determination of characteristics may be done for each optical data channel individually.

The analyzing means may comprise all or a part of the equipment needed for the determination of the characteristics of the optical transmission line. In general, the analyzing means in itself is only suitable for a coarse analysis, in particular for deciding whether an optical fiber is ready for operation or not. In case that the analyzing means comprises only a part of the equipment needed for the determination of (at least some of) the characteristics of the optical fiber, additional equipment is arranged at a host board carrying the transceiver module. Then an interaction between host board and transceiver module takes place, and their interaction is optimized in order to enable a smooth operation of the optical network.

In order to perform the monitoring measurement, it will be necessary to exchange parameters defining the measurement procedure as well as the kind of measurements, which depend on the system requirements:
  physical parameters (pulse width, modulation amplitude, frequency range . . . );
  time period of measurement, number of averages, number of samples;
  control signals (e.g. initialization of measurement);
  alarm signals.

The invention proposes to use the existing electrical bus for the transport of these parameters or data, e.g. by allocating a part of the available frequency range within the existing digital data bus.

DETAILED DESCRIPTION OF THE DRAWINGS

Figure 1:
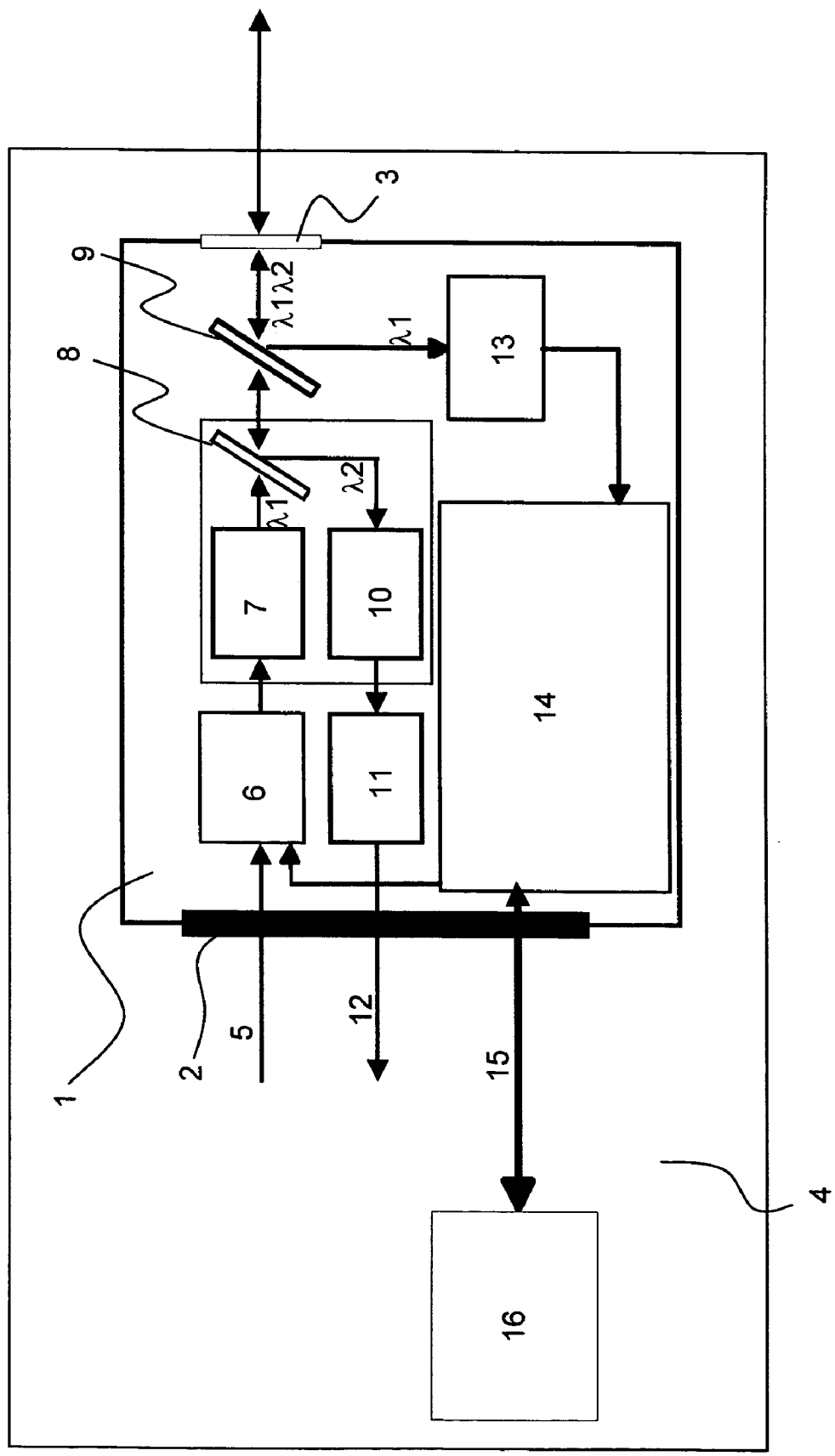
FIG. 1 shows schematically an inventive transceiver module installed on a host board.

FIG. 1 shows schematically an inventive optical transceiver module 1 enabling monitoring functions, here in case of OTDR measurements. The transceiver module 1 comprises an electrical interface 2 and an optical interface 3 where an optical transmission line (not shown) is attached. The electrical interface is connected to a host board 4.

Through the electrical interface 2, input payload data 5 is provided to a laser drive and control unit 6, which in turn is connected to a laser diode 7. The laser diode 7 emits in a particular channel light at a wavelength λ1. It passes through a WDM coupler 8 and an optical tap coupler 9 and into the optical interface 3. On the other hand, light of a wavelength λ2 is received at the optical interface 3. It passes through the tap coupler 9 and is reflected at the WDM coupler 8 onto a photo diode & TIA (transimpedance amplifier) (data) unit 10. The signal of the photo diode & TIA (data) unit 10 is fed into a LIA (limiting amplifier) & LOS (loss of signal) detect unit 11 and provided to the electrical interface 2 as output payload data 12.

In order to monitor the status of the optical fiber, the laser drive and control unit 6 may also emit test pulses at wavelength λ1 in order to check the channel operating at this wavelength. Some of this light with wavelength λ1 is backscattered within the optical transmission line, and therefore is present at the optical interface 3. This light is reflected at the tap coupler 9 onto a photo diode & TIA (OTDR) unit 13, and the signal of the photo diode & TIA (OTDR) unit 13 is fed into an analyzing means 14. Basically, the tap coupler 9 and the photo diode & TIA (OTDR) unit 13, together with the light emitting components and their control, represent a monitoring means within the transceiver unit 1. Within the analyzing means 14, the signal of the received backscattered light is analyzed, taking into account the original test pulse of wavelength λ1 and its time of emission (Actually, the analyzing means controls the emission of the test pulse). The result of this analysis is the processed measuring data, which is provided to the electrical interface 2.

The electrical interface 2 comprises a bidirectionally operating electrical control bus, here an I²C bus 15 operating at a clock rate of typically 100 or 400 kHz. Via this I²C bus 15, a control bus master unit 16 of the host board 4 is provided with the processed measuring data. The control bus master 16 may also provide the analyzing means 14 with monitoring parameters for the monitoring process. The I²C bus 15 is moreover intended for transport of diagnostic information, such as transceiver temperature or laser current, to the host board 4.

Figure 2:
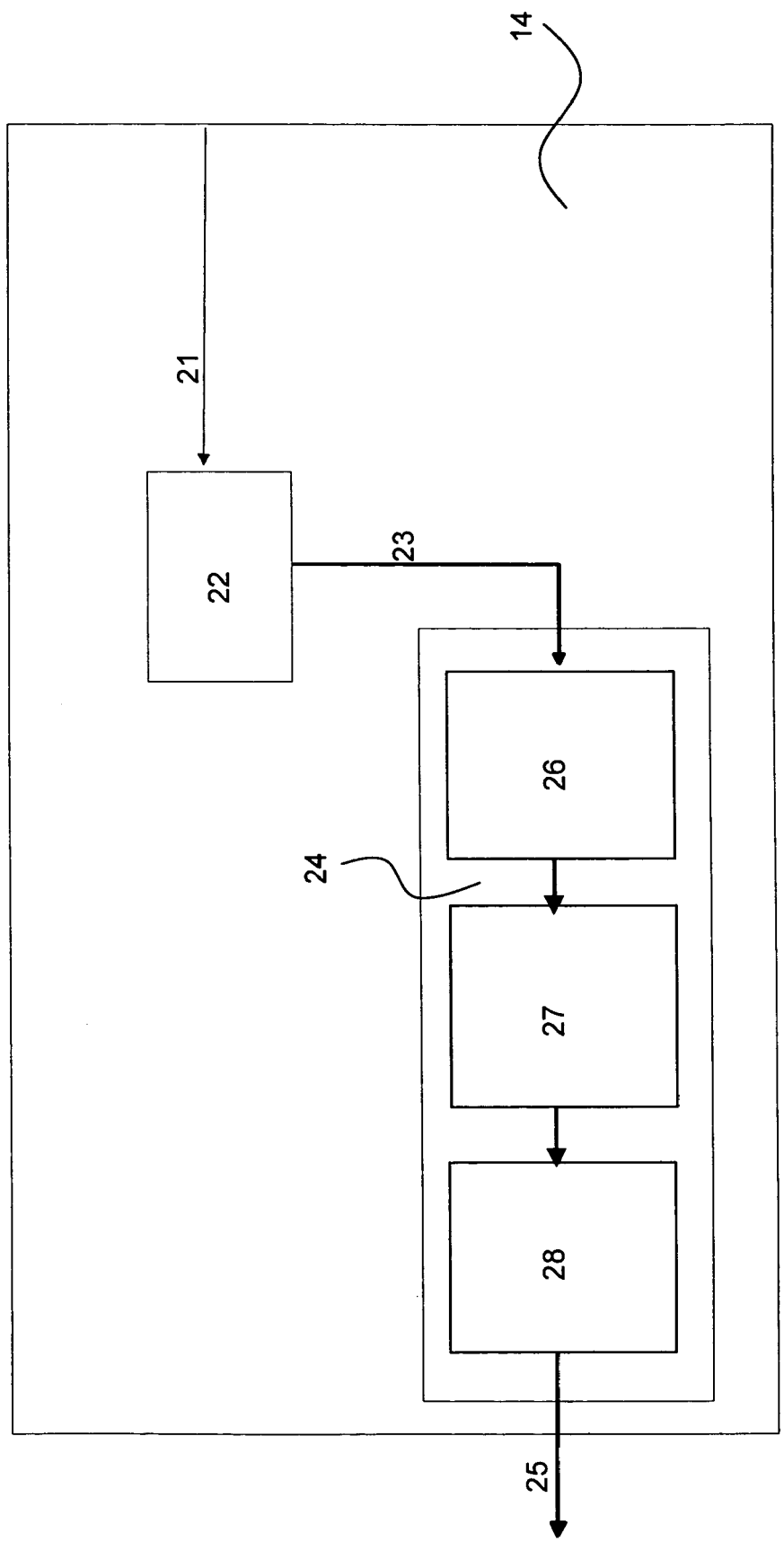
FIG. 2 shows schematically the analyzing means of the transceiver module of FIG. 1.

In FIG. 2, the interior of the analyzing means 14, which can also be considered as a processor/controller means, is described in more detail.

An ODTR signal 21 provided by the photo diode & TIA (ODTR) unit (reference number 13 in FIG. 1) is fed into a A/D conversion unit 22. It in turn provides the digital measuring data 23 which is fed into a processing unit 24. The processing unit 24 generates processed measuring data 25; the processed measuring data 25 is fed into the electrical interface, i.e. into its control bus (not shown in FIG. 2). The processing unit 24 comprises an input memory 26, a processing memory 27 and an output memory 28.

The processor unit 24 allows a decimation of the trace transfer frequency in order to adapt a fast acquisition of the measuring data (e.g. ten traces per second) to the properties of the control bus which typically has a slow transfer data rate (e.g. one trace per second).

The frequency of acquiring the OTDR data is given by
 the protocol used e.g. by burst mode operating systems (GPON, up-link) for single pulse OTDR technique, or
 by the tuning speed of the IF-filter for the swept sine wave technique.

The frequency of reading out the processed measuring data from the transceiver module to the host board is given by the serial clock rate of the I²C bus, which is in general used for the transport of diagnostic information (transceiver temperature, laser current, etc.).

In the example of FIG. 2, the ODTR signal 21 with a trace with 5000 samples and 10 kByte/trace is used. The digital measuring data 23 is read in with 10 traces per second into the input memory 26, which has a capacity of 10 kByte/trace. The processor memory 27 accomplishes the averaging of the incoming data with a capacity of 20 kByte/trace. After a desired averaging number (e.g. after 10000 averages) the resulting data is read into the output memory with a capacity of 10 kByte/trace, from where the data is transferred to the host board by use of the I²C bus. The I²C bus operates at 100 kBit/s clock rate.

The invention claimed is:

1. A transceiver module for an optical data network comprising:
 an optical interface for connection with an optical transmission line; and
 an electrical interface for connection with a host board the electrical interface configured to (i) provide the transceiver module with a first payload data to be sent on the optical transmission line and (ii) provide the host board with a second payload data read from the optical transmission line;
 monitoring units configured to monitor the optical transmission line, and provide measuring data; and
 an analysing unit configured to process the measuring data provided by the monitoring units in a statistical manner to adjust at least one characteristic of the measuring data, the analysing unit being connected to the electrical interface and configured to provide the processed measuring data to the electrical interface.

2. The transceiver module according to claim 1, wherein the electrical interface includes a bidirectionally operating electrical bus, in particular an I²C bus.

3. The transceiver module according to claim 1, wherein the analysing unit includes an analogue to digital conversion unit and a processing unit.

4. The transceiver module according to claim 3, wherein the processing unit includes an input memory, a processing memory, in particular suitable for an averaging operation, and an output memory.

5. The transceiver module according to claim 1, that wherein the monitoring units are designed to perform optical time domain reflectometry.

6. A transceiver arrangement comprising a transceiver module according to claim 1, and a host board, wherein the transceiver module is connected to the host board via the electrical interface only.

7. A method for making available measuring data from monitoring an optical transmission line coupled to an optical transceiver module according to claim 1, the method comprising:
 monitoring, by the monitoring unit, the optical transmission line;
 processing measuring data provided by the monitoring unit within the optical transceiver module in a statistical manner;
 generating processed measuring data, such that the processed measuring data is output via the electrical interface of the optical transceiver module.

8. The method according to claim 7, wherein during processing the measuring data of the monitoring unit, a trace transfer frequency is decimated.

9. The method according to claim 7, wherein the electric interface Is alee used to provide monitoring parameters to the optical transceiver module.

10. The method according to claim 7, wherein,
 the electric interface includes a bidirectionally operating electric bus, and part of available frequency range of the electric bus is allocated to providing monitoring parameters to at least one of the optical transceiver module and the processed measuring data.

11. The method according to claim 1, wherein the analysing unit is configured to process the measuring data in a statistical manner to reduce a data rate of the measuring data.

12. The method according to claim 1, wherein the analysing unit is configured to process the measuring data in a statistical manner by decimating trace sampling characteristics of the measuring data.

* * * * *